United States Patent [19]

Preuss

[11] 3,743,395

[45] July 3, 1973

[54] AUDIO-VISUAL PLAYBACK APPARATUS AND A SOUND AND PICTURE DISC ADAPTED THEREFOR

[75] Inventor: Heinz Preuss, Hannover, Germany

[73] Assignee: Pilot-Hydraulic GmbH, Zurich, Switzerland

[22] Filed: Apr. 27, 1972

[21] Appl. No.: 247,978

[30] Foreign Application Priority Data

Apr. 30, 1971 Germany .................. P 21 21 379.6

[52] U.S. Cl. ........... 352/103, 178/7.2, 178/DIG. 29, 352/21, 352/22, 352/26

[51] Int. Cl. ........................................... G03b 25/00

[58] Field of Search ................. 352/21, 22, 26, 102, 352/103; 178/7.2, DIG. 29

[56] References Cited

UNITED STATES PATENTS

| | | | |
|---|---|---|---|
| 1,864,519 | 6/1932 | Boularan | 352/103 X |
| 2,486,867 | 11/1949 | Morgan | 352/26 |
| 2,455,712 | 12/1948 | Von Soden | 352/26 |
| 2,203,437 | 6/1940 | Levy | 352/26 |
| 1,913,913 | 6/1933 | Boularan | 352/26 |
| 3,450,468 | 6/1969 | Davidson | 352/103 X |

*Primary Examiner*—Samuel S. Matthews
*Assistant Examiner*—Monroe H. Hayes
*Attorney*—Walter Becker

[57] ABSTRACT

An audio-visual playback apparatus for transparent picture images and sound recordings disposed in a spiral strip around the center of a disc which is rotatable at a constantly varying speed corresponding to a uniform playing speed. A pickup arm for a picture pickup is mounted on leadscrews on which the arm is advanced radially of the spiral and in synchronism with disc rotation. The pickup arm is located on one side of the disc, and a light source is mounted on the opposite side of the disc. A pickup head is mounted on the pickup arm to pickup both sound and pictures from the disc and also control signals from a spiral control track which is parallel with the sound track on the disc. The control signals modulate magnetic fields to vary the position of the objective so as to maintain the image in proper focus.

13 Claims, 5 Drawing Figures

AUDIO-VISUAL PLAYBACK APPARATUS AND A SOUND AND PICTURE DISC ADAPTED THEREFOR

The invention relates to an audio-visual playback apparatus for transparent picture images and sound recordings disposed in a spiral strip around the center of a disc which is rotatable at a constantly varying speed corresponding to a uniform playing speed, having a pickup arm for a picture pickup, which arm advances on leadscrews synchronously with the disc rotation and radially to the spiral and is situated on the side of the disc opposite to a light source.

The purpose of this type of apparatus is to play back the picture and sound information recorded on discs of the size used in gramophones, with particular reference to motion pictures, and to synchronize the image on a screen with the sound track transmitted to a loudspeaker.

The arrangement of a series of transparencies in the form of a spiral array about the center of a circular disc is known (German Pat. 213 771, 451 627 and 605 221), and it is also known to provide the same disc with a similarly spirally arranged sound track which can be played back mechanically acoustically in synchronism with the picture image. (German Pat. 573 381, 682 073 and 594 531).

In the known playback apparatuses for discs of this type, the necessary playing motion tangential to the spiral is obtained by rotating the disc, but that radial to the spiral is obtained by displacing the picture pickup. In the known apparatuses (German Pat. 563 315, 573 381 and 682 073) this is effected by displacing a pickup arm radially over the disc by means of lead-screws, which are driven by an electric motor through a gearbox bringing the rotary speed of the leadscrews into line with the angular speed of the picture track, so that the picture pickup on the arm remains aligned with the picture track moving underneath it and the similarly moving light source on the far side of the disc. Optical compensation for the tangential motion of the picture ensures that the viewer will see a stationary image; one may for example provide a lens wheel (German Pat. 594 531 and 682 073) or a swivelling mirror (German Pat. 563 315) to follow the tangential motion of the picture. Its radial motion is compensated by making the picture pickup follow the lift of the picture track. The resulting variations in the optical projection axis are ignored in the known apparatuses.

The sound is picked up in the conventional manner in the apparatuses described above, by means of a tracking needle which follows the sound-modulated grooves; the sound track is arranged in another spiral about the center of the disc, and although separate from the picture track it can be played synchronously therewith.

U.S. Pat. specification No. 3 404 224 discloses an audio-visual playback apparatus in which the pickup arm is mounted on a swivel in the conventional manner used in record players. It scans the reflecting picture track in the manner known for epidiascopes and at the same time a tracking needle picks up the mechanical sound track from a groove disposed alongside the picture track. The individual picture signal is transmitted through a glass-fiber optical system to a television camera and thence directly to a television receiver, while the picture motion is converted from continuous to intermittent by placing a rotatable slit in front of the camera.

However, the difficulty now arises that the disc bearing the recorded information inevitably nutates as it rotates. Whereas nutation effects can be suppressed in the known manner with pure sound pickups, they lead in picture pickups to an unacceptable variation in the distance between the objective and the plane of the picture track. No means have been disclosed for overcoming nutation effects in the apparatuses described above, and it is accordingly only possible to focus the objective sharply on a mean value. Since the depth of focus is necessarily small, nutation must result in rhythmic variations of the image focus, which are extremely disturbing and fatiguing to the viewer. Again, if a disc is to have an adequate playing time, which is particularly essential in the case of motion pictures, it is desirable to make the individual pictures as small as possible, bearing in mind the need to reserve a considerable proportion of the disc area for the sound track. In view of the necessarily high magnification, the objective must have the widest possible aperture, which once again limits its depth of focus. In another direction, the intensity of the light sources used for direct projection is restricted by the sensitivity of the film material to overheating, and this sets a lower limit on the picture size.

The object of the invention is to combine the inertialess adjustment of the focus to movements of the disc with the accommodation of the maximum amount of picture and sound information on a disc of the size commonly used for gramophone records. It is a further object of the invention to provide an audio-visual playback apparatus corresponding in size, ease of operation and simplicity to a record-player, for connection to a commercial television receiver and adapted to take discs no larger than the conventional long-playing records yet giving approximately the same playing time.

According to the present invention, an audio-visual playback apparatus for transparent picture images and sound recordings disposed in a spiral strip around the center of a disc which is rotatable at a constantly varying speed corresponding to a uniform playing speed, comprises a pickup arm for a picture pickup, which arm, in use, is advanceable on leadscrews synchronously with disc rotation and radially to the spiral and is situated on a side of the disc opposite to a light source, a pickup head on the pickup arm, adapted, in use, to pick up both the picture and sound signals, having a pickup which, in use, transforms into electrical pulses, optical control signals from a control track running along the disc parallel to and immediately alongside a picture track and a sound track, and a picture-transmitting objective which is, in use, displaceable axially by magnetic fields modulated by these signals so that the distance between the picture plane in the disc and the objective is held constant against disc movements in the direction of the optical axis.

The apparatus of the invention may incorporate the following features:

a. a rod-shaped light source fixed rigidly in its lid, subtending the disc radius and emitting three parallel strips of light at right angles to the disc surface;

b. a rotatably mounted disc disposed under the light source and carrying the picture track, the sound track and the control track;

c. a pickup head guidably mounted on the pickup arm under the disc and incorporating, one behind the other in the direction of disc movement and registering with the corresponding tracks on the disc, first a pickup for the control signals from the control track, then a picture pickup and finally a sound pickup, so that a picture on the picture track and the corresponding sections of the sound track and the control track are all picked up simultaneously;

d. a shutter for the control track, in the surface of the pickup head, to admit a short section of the control track, which constitutes a continuous transparent strip of constant width, a cylindrical lens disposed under the shutter at an angle of 45° to the control track, to form an image of the short section of the control track in the plane of two photodetectors so disposed that an increasing amount of light falls on one of them when the disc moves away from the cylindrical lens and on the other when the disc moves nearer thereto;

e. two solenoids disposed round the picture-transmitting objective and controlled by the photodetectors, whose magnetic fields displace the objective axially in the direction of the optical axis, in the two opposite directions corresponding to the disc movements;

f. a condenser in the same mounting as the objective and moving axially therewith, to collimate the divergent beam from the objective.

The tangential picture movement can be compensated by placing a rotatable prism with an even number of sidefaces in the path of the beam from the picture pickup.

The collimated beam from the picture pickup can be directed on to a television camera for black-and-white pictures or a triple-tube camera for the monochromatic images derived from the picture formed by the picture pickup by interposing the color-filter mirrors to split up the original picture.

A common driving system can be provided for the disc table and the pickup arm, controlling the rotary speed so that the disc playing speed is kept constant. This driving system can consist in that a driving shaft connected mechanically to the spindle of the disc table is fitted with a drum on which is wound a tape unwound by a motor rotating at a constant angular speed, so that the angular speed of the driving shaft increases in conformity with the angular speed required for the disc.

It is preferable to keep the disc table as small as possible, so as to make the maximum disc area available for recording. So that the disc shall nevertheless rest firmly on the disc table it is proposed to provide the disc with a central sheet metal element attracted by a magnetic core in the disc table and with non-interchangeable perforations for driving pins in the disc table. The object of the last provision is to ensure that the disc can be initially positioned with the starts of the tracks exactly over the pickup arm.

Finally, it is preferred to protect the recording layer in the disc by providing a sealing film of transparent material on both faces.

It is preferred to use an optical sound track of the type in itself known, since it can be reproduced on the recording layer of the disc simultaneously with and by the same process as the picture track and the control track. This substantially simplifies disc manufacture compared with the use of a magnetic or mechanical sound track, which would have to be reproduced in separate operations.

The playback apparatus of the invention can be used for motion pictures complete with sound dubbing. Moreover, by connecting the driving motor suitably it can be used to project a series of stills in a predetermined or voluntarily selected sequence, accompanied singly or in groups by a sound transmission. In this respect, the discs played back on the apparatus are particularly adapted as data storage devices, and the apparatus itself is suitable for use as a selection or reproduction apparatus for stored information. The apparatus of the invention will normally be connected to a conventional television receiver; however, to a limited extent it can be used for direct projection or in conjunction with a copier.

One embodiment of the invention will now be described in greater detail, by way of example, with reference to the accompanying drawings, in which.

Figure 4:
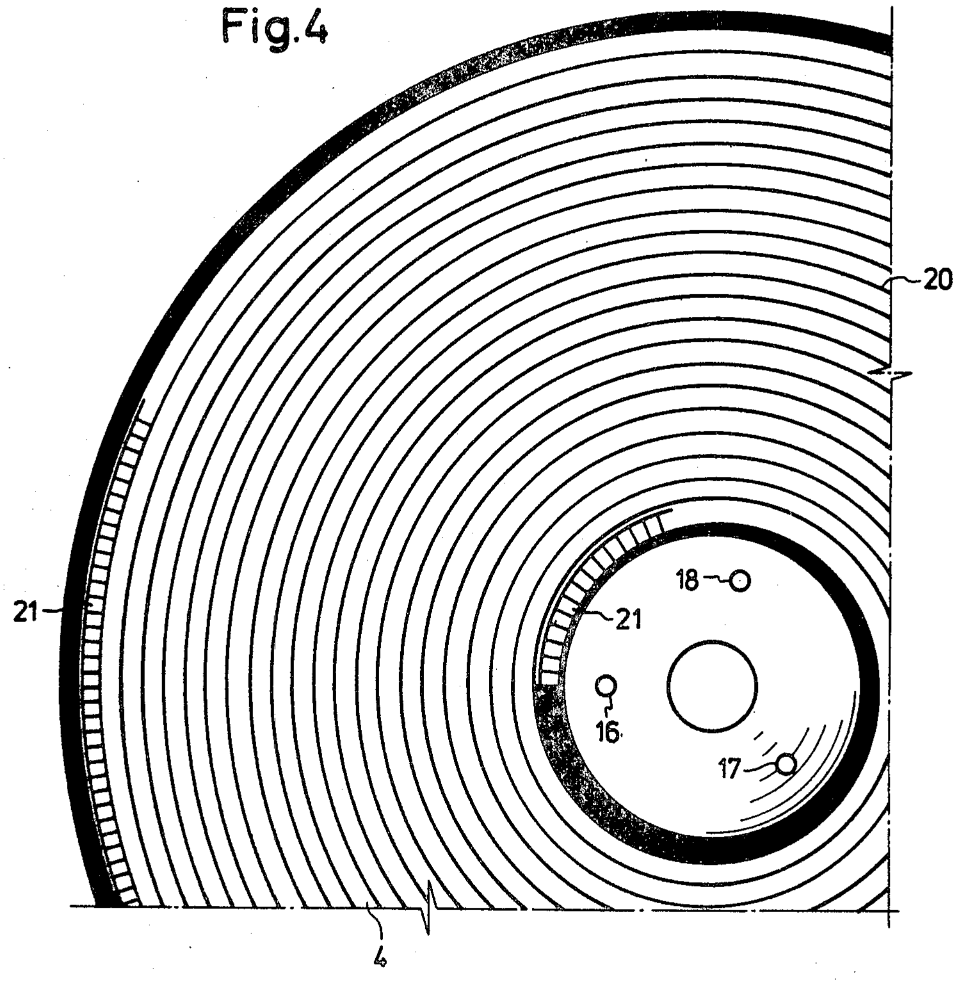
FIG. 4 is a plan view of part of a recording disc for the apparatus of the invention.
Figure 5:
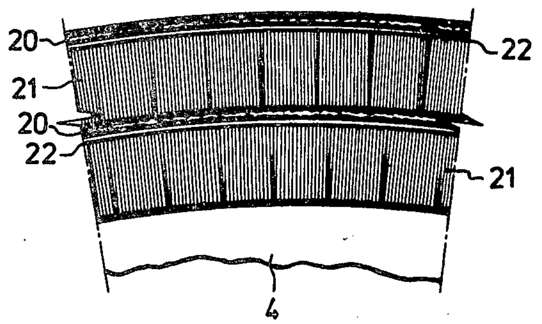
FIG. 5 is a similar view to FIG. 4, on a much larger scale.

The apparatus is of flat construction with a casing 1 and a hinged lid 2 inside which is mounted a tubular light source 3 extending radially over an information-carrying disc 4 so that the full extent of the information-carrying part of the disc is subtended. The light from the source 3 is split up into three parallel strips at right angles to the surface of the plate 4. To this end, three parallel slits 6, 7 and 8 are provided in a floor of the casing 1 and two mirrors angled at 45° to the plane of the disc 4 are mounted alongside the light source; the slits and mirrors are parallel to the axis of the light source 3 and of the same length. A playdeck 14 is provided with slits 10, 11 and 12, underneath and registering with the slits 6, 7 and 8. A disc table 15 is mounted rotatably over the playdeck and fitted with non-interchangeable driving pins which engage in corresponding holes 16, 17 and 18 in the disc 4 (see FIG. 4), so that the disc 4 is accurately centered and located relative to a pickup arm. The disc table 15 is further provided with a magnetic core to attract a central sheet metal insert in the disc 4, thereby ensuring that it cannot tilt on the disc table. This is an essential feature, since the disc table cannot be very large in diameter without excessively restricting the recording surface area of the disc.

The disc 4 is the same diameter as a conventional long-playing record. It is provided with an information-carrying layer 19 in the form of an exposed and developed photographic film, blackened all over apart from sound track 20, picture track 21 and control track 22. The sound track 20, the picture track 21 and the control track 22 are each disposed spirally about the center of the disc, running in at a constant lift angle from the edge of the disc to an opaque central circular hub which lies over the disc table 15. The central hub contains the sheet metal element attracted to the magnetic core in the disc table. The sound track 20 is a continuous optical sound track of the conventional form and modulates the light beam which passes through the slits 6 and 10. With it is associated the picture track 21, which constitutes a continuous series of micro-transparencies, the frames of a motion picture for example, arrayed without intermediate gaps at the corners nearest the rim of the disc and consequently overlapping slightly, though negligibly from the point of view of reproduction, at the corners nearest the disc center, while the edges nearest the disc rim are exactly synchronized with the sound track. The area of each picture is for example 3.7 $mm^2$ and the shape conforms to the conventional television screen shape. Between the sound and picture tracks is disposed a control track 22 in the form of a continuous transparent strip, narrow and running parallel with the sound track. The information-carrying layer 19 is protected above and below by fully transparent sealing layers 23 and 24 of hard synthetic resin, which shield it thoroughly against mechanical damage and keep surface scratches and adherent dust particles well away from the very limited sharp-focus zone of the objective in the picture pickup.

A pickup arm 27 is guidably mounted on the fine-thread lead-screws 25 and 26 underneath the playdeck 14. Its pickup head 28 under the slits 10, 11 and 12 includes a sound pickup 31 for the control pulses, and with respect to the direction of movement (arrow in FIGS. 3 and 4) of the tracks 20, 21 and 22, the last-named is in front.

Mountings 32 fixed to the floor of the casing 1 support lead-screws 25 and 26, which are driven by bevel-gear pairs 33, 34 and 35, 36 and a similarly supported main shaft 37. The latter carries a worm 38 engaging a worm-gear 39 on a spindle 40 of the disc table 15, whereby the disc is rotatable. As playing proceeds, the angular speed of the tracks in the disc increases; the disc is driven at the correct speed throughout by a synchronous motor 41 and a roller 42, round which a tape 45 is unwound from a spool 46 and wound on to a spool 47, which is driven by a motor not shown. The tape 45 is guided by rollers 44a and urged against the roller 42 by idling rollers 44 and the spring 43. A spur gear 48 keyed to the axis of the spool 46 meshes with a spur gear 50 keyed to the same shaft as a bevel-gear 49. The latter meshes with a bevel-gear 51 keyed to the end of the main shaft 37 and transmits the driving motion to the main shaft, the leadscrews 25 and 26 and the disc table spindle 40.

As the tape 45 is paid off the spool 46 the working radius is reduced; hence the angular speed increases at the rate needed for the disc to produce a continuous and uniform tracking speed. The synchronous motor can be adjusted to a desired or prescribed rotary speed by means of a resistance controller for example, though this is not shown. A quick-return mechanism actuated by pushbuttons can wind the tape 45 back from the spool 47 to the driving spool 46.

It is within the scope of the invention to control the running speed by different means, but the arrangement here proposed is preferred for its high control accuracy, which is essential to the apparatus.

In the pickup head 28, the sound picture and control signal pickups are set alongside each other, tangential to the tracks on the disc and radial to each other, so that each registers under its appropriate track as the disc rotates over it. The sound is picked up in the conventional manner. The light from the slit 6 passes through the sound track 20 and the split 11 and enters a photocell 55 as a sound-modulated light beam 53, through a suitable restricting diaphragm 52 and an optical magnifying system 54. The variations in the sound-modulated light beam intensity alter the resistance of the photocell, and the sound signals are amplified and fed to the loudspeaker. The strip of light from the slit 7 passes through a picture in the picture track 21, the slit 11 and a diaphragm 56, which corresponds in size to the picture image and allows a size-corrected beam 57 to enter the picture pickup 30. An optical magnifying system 58 and a rotating octagonal prism 59 produce a stationary image which is reflected by a mirror 60 into an axially displaceable objective 61. Accordingly, the size corrected beam 57 is focused by a condenser lens 62 to form a stationary image in a picture plane 63 of a television camera 75. The condenser lens 62 and the objective 61 are held in a common mounting and undergo the same axial displacements; the changes in the length of the light path only affect the collimated beam. The prism 58 rotates in synchronism with the picture track; in other words, as each transparency passes over the diaphragm 56 it is tracked by one face of the prism being continually advanced with it. The prism is driven by the lead-screw 26, through additional mechanism not shown.

Figure 2:
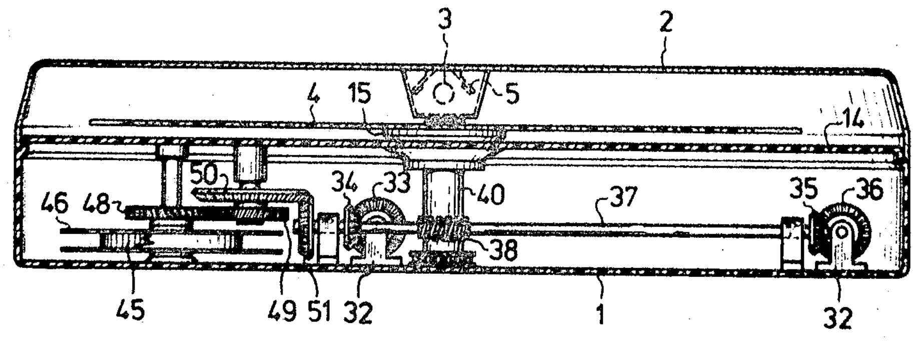
FIG. 2 is a section on the line II—II of FIG. 1.
Figure 1:
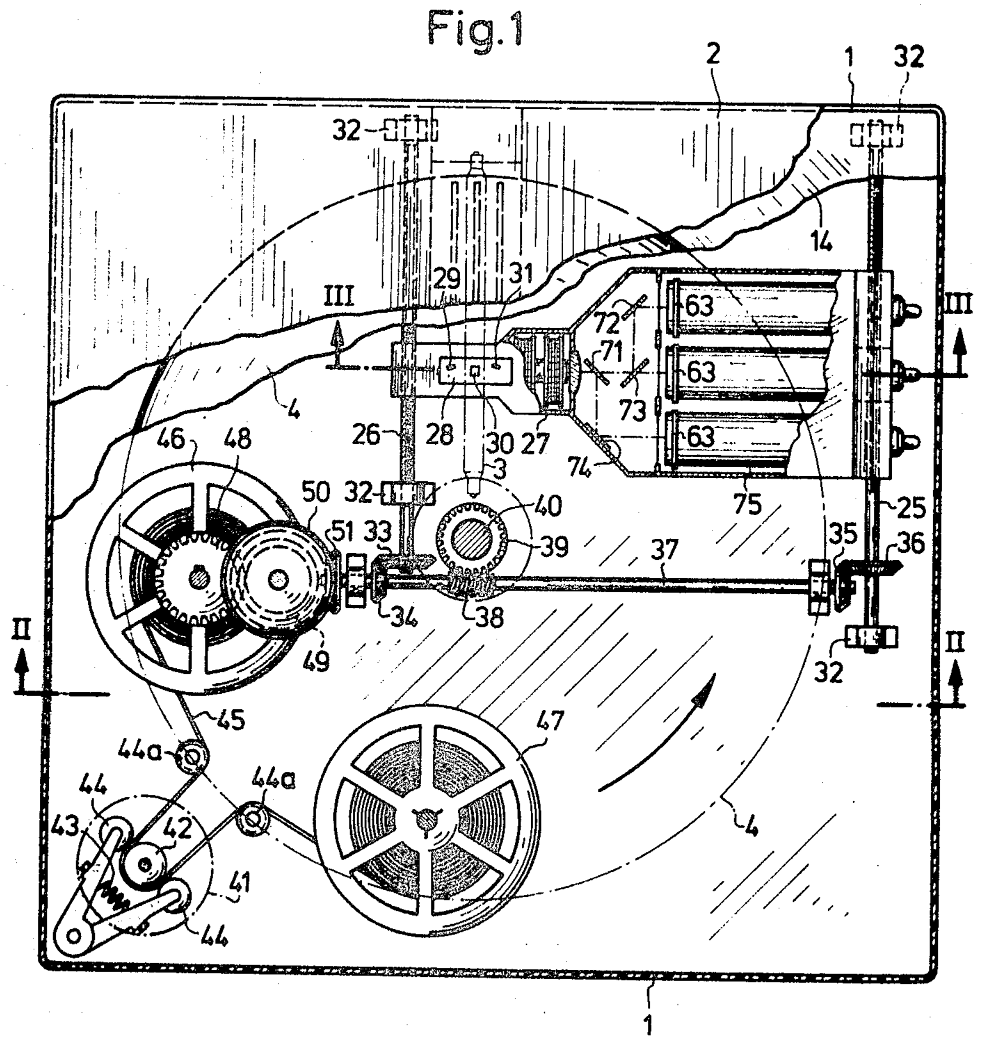
FIG. 1 is a plan view of the playback apparatus of the invention, with the lid and upper cover partly cut away to reveal the internal arrangements.
Figure 3:
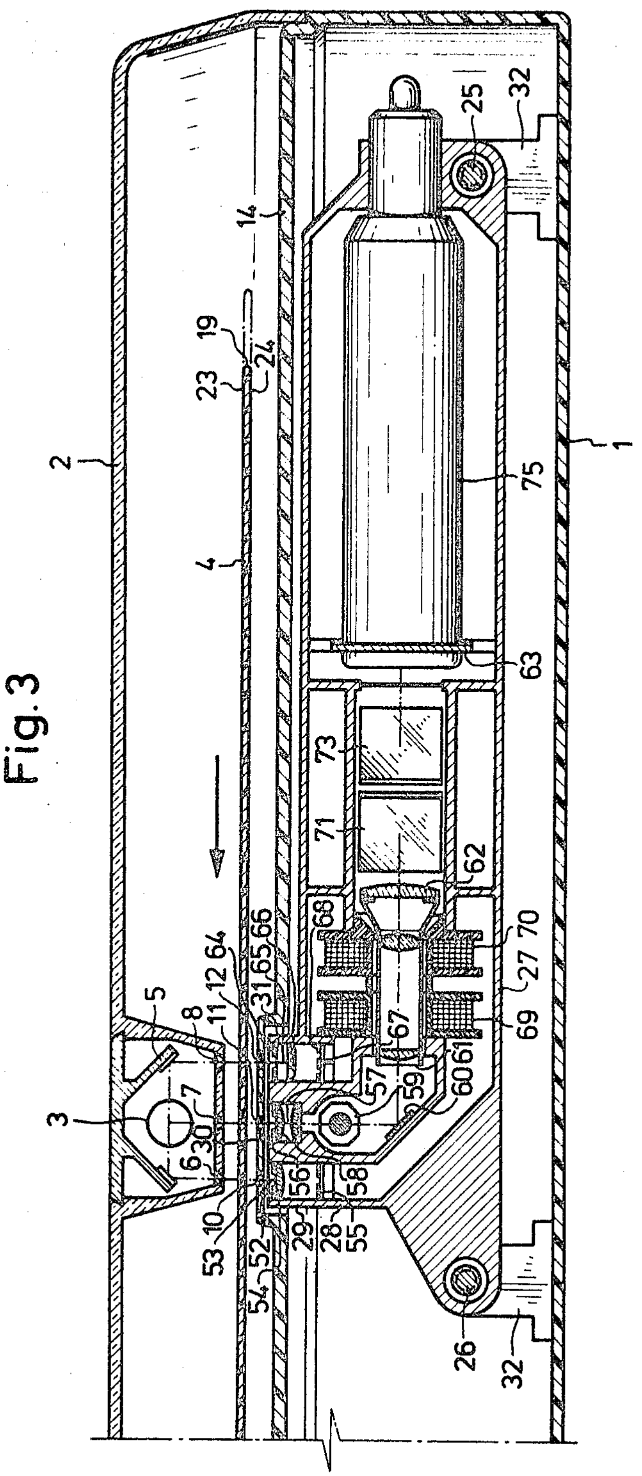
FIG. 3 is a section on the line III—III of FIG. 1.

The distance between the picture plane in the disc 4 and the objective 61 is kept constant by an automatic controller which displaces the objective axially in conformity with any vertical movements of the disc. The light from the slit 8 passes through the control track in the disc 4 and the slit 12, under which is a diaphragm 64 to produce a size-corrected beam 65 corresponding in cross-section to a short section of the control track 22 associated with the picture currently being picked up. This beam 65 is opened out by a cylindrical lens 66 disposed at an angle of 45° to the direction of the control track. When the disc position is correct, the resulting image of the control-track section falls exactly between two photocells 67 and 68 underneath the cylindrical lens. On the other hand, if the distance from the disc to the objective and hence from the disc to the cylindrical lens 65 varies in the positive or negative direction, the image of the control-track section is rotated so that one or other of the photocells 67 and 68 receives extra light. The changes in the resistances of the photocells 67 and 68 brought about by these control signals regulate the magnetic field strengths in solenoids 69 and 70 respectively, so that the tube containing the objective 61, which these solenoids surround is displaced axially to the left or the right (FIG. 3). The extent of the displacement is adjusted so that it keeps the distance between the picture plane in the disc 4 and the objective 61 constant at all times. This electronic control is almost inertialess. The delay in the response of the objective, which is small because the inertia of mass of the objective 61 is small, but it is nevertheless offset by the fact already referred to that the pickup 31 for the control signals leads the picture pickup 30. The correction is significant not only for the sharpness of focus but also for satisfactory sound reproduction, since the sound quality is also affected by disc nutation.

By incorporating color-filter mirrors 71, 72, 73 and 74 to split the beam leaving the condenser lens 62 into three separate color images to which the tubes of a three-color camera 75 are allocated, the apparatus can be used to reproduce color pictures.

The synchronous motor can be set at any speed in a continuous range between 1 and 50 frames per second, so that time-lapse and picture-snatch effects can be achieved. It is even possible to display stills from the picture track 21 as with a projector. Likewise, certain pictures can be selected by programming for projection by running the motor at high speed to the required position. Hence, the disc 4 can be used as an information storage device of quite considerable capacity, within which any piece of information can be reached easily and quickly. Pieces of information may consist of individual pictures and series of pictures with sound dubbing. Even when single-picture projection is used, the automatic focus control described above is still essential.

What I claim is:

1. An audio-visual playback apparatus for transparent picture images and sound recordings disposed in a spiral strip around the center of a disc which is rotatable at a constantly varying speed corresponding to a uniform playing speed, comprising a pickup arm for a picture pickup, leadscrews located adjacent one side of said disc for advancing said arm synchronously with disc rotation radially of the spiral, a light source positioned adjacent the opposite side of said disc, a pickup head on said pickup arm to pick up both the picture and sound signals, a control track running along said disc parallel to and immediately alongside a picture track and a sound track, a pickup provided on said pickup arm for transforming into electrical pulses optical control signals from said control track, a picture transmitting objective, and means for displacing said picture transmitting objective axially by magnetic fields modulated by said signals so that the distance between the picture plane in said disc and the objective is held constant against disc movements in the direction of the optical axis.

2. A playback apparatus as claimed in claim 1, comprising a. a lid and a rod-shaped light source fixed rigidly in said lid and subtending the radius of the disc and emitting three parallel strips of light at right angles to the disc surface;

b. a rotatably mounted disc disposed under said light source and carrying the picture track, the sound track and the control track;

c. said pickup head being guidably mounted on said pickup arm under said disc and incorporating, one behind the other in the direction of disc movement and registering with the corresponding sound, picture and control tracks on said disc, a picture pickup and a sound pickup, so that a picture on said picture track and the corresponding sections of said sound track and said control track are all picked up simultaneously;

d. an aperture for said control track, a surface of said pickup head in which said aperture is located, to admit a short section of said control track, which constitutes a continuous transparent strip of constant width, a cylindrical lens disposed under said aperture at an angle of 45° to said control track, to form an image of said short section of the control track in the plane of two photodetectors so disposed that an increasing amount of light falls on one of them when said disc moves away from said cylindrical lens and on the other when said disc moves nearer thereto;

e. two solenoids disposed round said picture-transmitting objective and controlled by said photodetectors, whose magnetic fields displace said objective axially in the direction of the optical axis, in the two opposite directions corresponding to the movements of said disc; and f. a condenser in a same mounting as the objective and movable axially therewith, to collimate the divergent beam from said objective.

3. A playback apparatus as claimed in claim 2, wherein a rotatable prism with an even number of side-faces is placed in the path of the beam from said picture pickup to compensate the picture movement.

4. A playback apparatus as claimed in claim 3, wherein said collimated beam from said picture pickup is directed on to a television camera for black-and-white pictures or a triple-tube camera derived in its image plane from the picture formed from said picture pickup by interposing color-filter mirrors to split up the original picture.

5. A playback apparatus as claimed in claim 1, wherein a common driving system is provided for a disc table and said pickup arm controlling the rotary speed so that the playing speed for said tracks on said disc can be regulated.

6. A playback apparatus as claimed in claim 1, comprising a driving shaft, a spool fitted on said driving shaft, a tape wound or unwound onto or from said spool by a motor rotatable at a constant angular speed, which motor drives said disc table and said leadscrews.

7. A playback apparatus as claimed in claim 6, wherein said disc table is provided with a magnetic core.

8. A playback apparatus as claimed in claim 6, wherein said disc table is provided with driving pins.

9. A playback apparatus as claimed in claim 1, wherein said sound track is of the optical type.

10. A playback apparatus as claimed in claim 1, wherein said control track is of the optical type.

11. A playback apparatus as claimed in claim 9, wherein the information-carrying layer of said disc is protected on both sides by a sealing film of completely transparent material.

12. A playback apparatus as claimed in claim 7, wherein said disc is provided with a central sheet metal element.

13. A playback apparatus as claimed in claim 8, provided with non-interchangeable perforations.

* * * * *